(12) United States Patent
Kim et al.

(10) Patent No.: US 8,565,579 B2
(45) Date of Patent: Oct. 22, 2013

(54) METHOD OF UPDATING ADDITIONAL DATA AND APPARATUS FOR REPRODUCING THE SAME

(75) Inventors: Kwang-Min Kim, Seoul (KR); Sung-Wook Park, Seoul (KR); Man-Seok Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1178 days.

(21) Appl. No.: 11/958,510

(22) Filed: Dec. 18, 2007

(65) Prior Publication Data

US 2008/0240676 A1    Oct. 2, 2008

(30) Foreign Application Priority Data

Mar. 27, 2007   (KR) .................. 10-2007-0030055

(51) Int. Cl.
*H04N 9/80*   (2006.01)

(52) U.S. Cl.
USPC .......................................... 386/241; 386/239

(58) Field of Classification Search
USPC .................................................. 386/239, 241
See application file for complete search history.

(56) References Cited

U.S. PATENT DOCUMENTS

| | | | | |
|---|---|---|---|---|
| 7,583,887 B2* | 9/2009 | Kim et al. | ..................... | 386/248 |
| 7,751,692 B2 | 7/2010 | Kim et al. | | |
| 8,036,515 B2 | 10/2011 | Tanaka et al. | | |
| 8,208,789 B2* | 6/2012 | Brodersen et al. | ............ | 386/241 |
| 2003/0231861 A1 | 12/2003 | Yoo et al. | | |
| 2004/0076402 A1* | 4/2004 | Jung et al. | ....................... | 386/69 |
| 2004/0174795 A1* | 9/2004 | Jung et al. | ....................... | 369/69 |
| 2004/0190405 A1* | 9/2004 | Tsumagari et al. | .......... | 369/47.1 |
| 2004/0264930 A1 | 12/2004 | Yoo et al. | | |
| 2005/0105892 A1 | 5/2005 | Sugimura et al. | | |
| 2005/0125428 A1 | 6/2005 | Kang et al. | | |
| 2005/0141879 A1 | 6/2005 | Chung et al. | | |
| 2007/0206927 A1* | 9/2007 | Kim et al. | ....................... | 386/95 |
| 2007/0217305 A1 | 9/2007 | Seo et al. | | |
| 2009/0103902 A1* | 4/2009 | Matsuura et al. | ............. | 386/124 |
| 2010/0092156 A1* | 4/2010 | McCrossan et al. | .......... | 386/104 |
| 2010/0129052 A1* | 5/2010 | Fujinami et al. | ................ | 386/69 |

FOREIGN PATENT DOCUMENTS

| | | |
|---|---|---|
| EP | 1 158 800 A1 | 11/2001 |
| EP | 1 437 739 A2 | 7/2004 |
| EP | 1677531 | 7/2006 |
| KR | 10-2003-0033852 A | 5/2003 |

(Continued)

OTHER PUBLICATIONS

International Search Report and Written Opinion issued in corresponding International Application No. PCT/KR2008/000386 dated Apr. 4, 2008.

(Continued)

*Primary Examiner* — Kambiz Zand
*Assistant Examiner* — Benjamin Kaplan
(74) *Attorney, Agent, or Firm* — NSIP Law

(57) ABSTRACT

A method of updating additional data, and an apparatus for reproducing the same, the method includes: downloading the additional data, which includes clip information and a clip stream that can be reproduced concurrently with a play item of the Audio Visual (AV) data; referring to the clip information and updating reproduction information of the play item; and reproducing the clip stream in synchronization with a current reproduction time of the main video stream of the play item, by using to the updated reproduction information.

21 Claims, 6 Drawing Sheets

(56) References Cited

FOREIGN PATENT DOCUMENTS

| KR | 10-2003-0035272 A | 5/2003 |
| KR | 10-2004-0076560 A | 9/2004 |
| KR | 2006-111526 | 10/2006 |
| WO | WO 2004/077434 A1 | 9/2004 |
| WO | WO 2005/109434 A1 | 11/2005 |
| WO | WO 2006/073260 A2 | 7/2006 |

OTHER PUBLICATIONS

Japanese Office Action issued Sep. 27, 2011, in counterpart Japanese Application No. 2010-500815 (1 pg).

Korean Office Action issued Dec. 1, 2011, in counterpart Korean Application No. 10-2007-0030055 (6 pages, including an English translation of the first page only).

European Office Action issued Feb. 12, 2013 in counterpart European Patent Application No. 08 704 907.8—1954 (5 pages, in English).

* cited by examiner

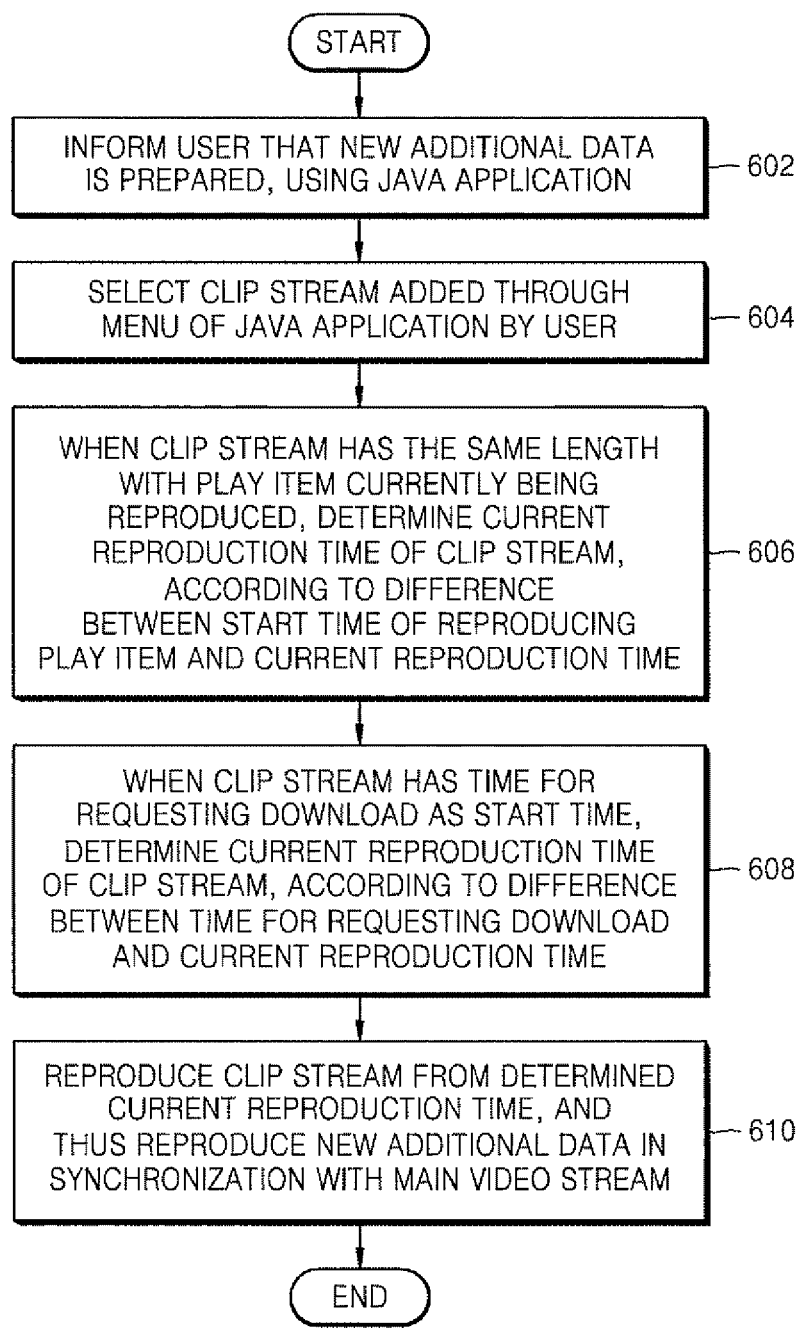

METHOD OF UPDATING ADDITIONAL DATA AND APPARATUS FOR REPRODUCING THE SAME

CROSS-REFERENCE TO RELATED APPLICATION

This application claims the benefit of Korean Application No. 2007-30055, filed Mar. 27, 2007, in the Korean Intellectual Property Office, the disclosure of which is incorporated herein by reference.

BACKGROUND OF THE INVENTION

1. Field of the Invention

Aspects of the present invention relate to a method and an apparatus for reproducing Audio Visual (AV) data.

2. Description of the Related Art

In a conventional blue-ray disk player, when data recorded on a disk and additional data downloaded through a network are to be reproduced together, the additional data, such as subtitle/audio data (or stream data) and a database file of subtitle/audio data (a play list and a clip information file based on the blue-ray disk standard) are downloaded together, and then the downloaded file and the file recorded on a disk are bound while title converting is performed, thereby forming a new virtual file system (a virtual package). Accordingly, downloaded additional data is reproduced with data recorded on a disk, based on the new virtual file system.

However, according to the conventional blue-ray disk player, when updating of a virtual package is completed, a title is converted, and after the title conversion is completed, additional data downloaded by a user can be selected. Thus, before the title conversion is performed, even if downloading is completed, downloaded data cannot be used. In addition, even if the downloading of subtitle/audio data, which is not provided by a disk, is performed in the middle of watching a movie, a title should be converted to reproduce new subtitle/audio, so that the movie currently being reproduced must be stopped, or a title must be reproduced from a starting point.

SUMMARY OF THE INVENTION

Aspects of the present invention provide a method of updating additional data and an apparatus for reproducing the additional data, in which new additional data is downloaded and reproduced without a title conversion being performed, while reproducing Audio Visual (AV) data, so as not to stop the reproduction of AV data.

According to aspects of the present invention, there is provided a method of updating additional data, with respect to audio visual (AV) data, including: downloading additional data including a clip stream and clip information, which can be reproduced with a play item currently being reproduced; referring to the clip information and updating reproduction information of the play item; and referring to the updated reproduction information to reproduce the clip stream in synchronization with a current reproduction time of a main video stream of the play item.

According to aspects of the present invention, the downloading of the clip may include: sending reproduction information of the play item to a server, when a downloadable additional data list is requested, by using a menu displayed on a display showing the AV data; displaying the received additional data list on the menu, when the additional data list retrieved from the server, according to the reproduction information that is received; sending a request to the server for downloading additional data selected from the displayed additional data; and receiving a clip stream and clip information corresponding to the additional data selected from the server.

According to aspects of the present invention, the updating of the reproduction information of the play item may include: parsing the clip information and referring to the parsing result, so as to add a new clip stream to the reproduction information of the play item, in a form of a sub-path; recording reproduction start time information of a clip stream, as a start time of a sub-path for the added clip stream; and recording a file location of the clip stream in the play item reproduction information.

According to aspects of the present invention, the reproducing of the clip stream may include: informing a user that the additional data is prepared for reproduction, by using the menu displayed on the display showing the AV data; and inputting a request for reproducing the additional data, through the menu.

According to aspects of the present invention, the reproducing of the clip stream may include: determining a reproduction start time of the clip stream, according to a difference between the reproduction start time of the main video stream and the current reproduction time of the main video stream, when the clip stream has the same length as the main video stream; and determining a current reproduction time of the clip stream, according to a difference between a download request time and a current reproduction time of the main video stream, when the clip stream has the download request time as a reproduction start time.

The additional data may be one of subtitle data, audio data, sub-video data, and interactive graphic data.

According to other aspects of the present invention, there is provided an apparatus for reproducing AV data and additional data, the apparatus including: a communication unit to communicate with a server; a reproduction control unit to download a clip corresponding to the additional data, to concurrently reproduce AV data and a clip stream, in synchronization with the current reproduction time of a main video stream of the play item, when reproducing the additional data is requested; and an additional data adding unit to refer to clip information included in the downloaded additional data to update play item reproduction information. The clip stream can be reproduced with a main video stream of the play item currently being reproduced through the communication unit.

According to aspects of the present invention, the downloadable additional data may be one of subtitle data, audio data, sub-video data, and interactive graphic data. The reproduction of AV data recorded on a blue-ray disk and a blue-ray disk player, are described above. However, the aspects of present invention are not limited thereto and can be applied to other forms of AV data and to other apparatuses for reproducing AV data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which:

FIG. 6 is a flowchart illustrating a method of reproducing new additional data, according to an exemplary embodiment of the present invention.

DETAILED DESCRIPTION OF THE EMBODIMENTS

Figure 1:
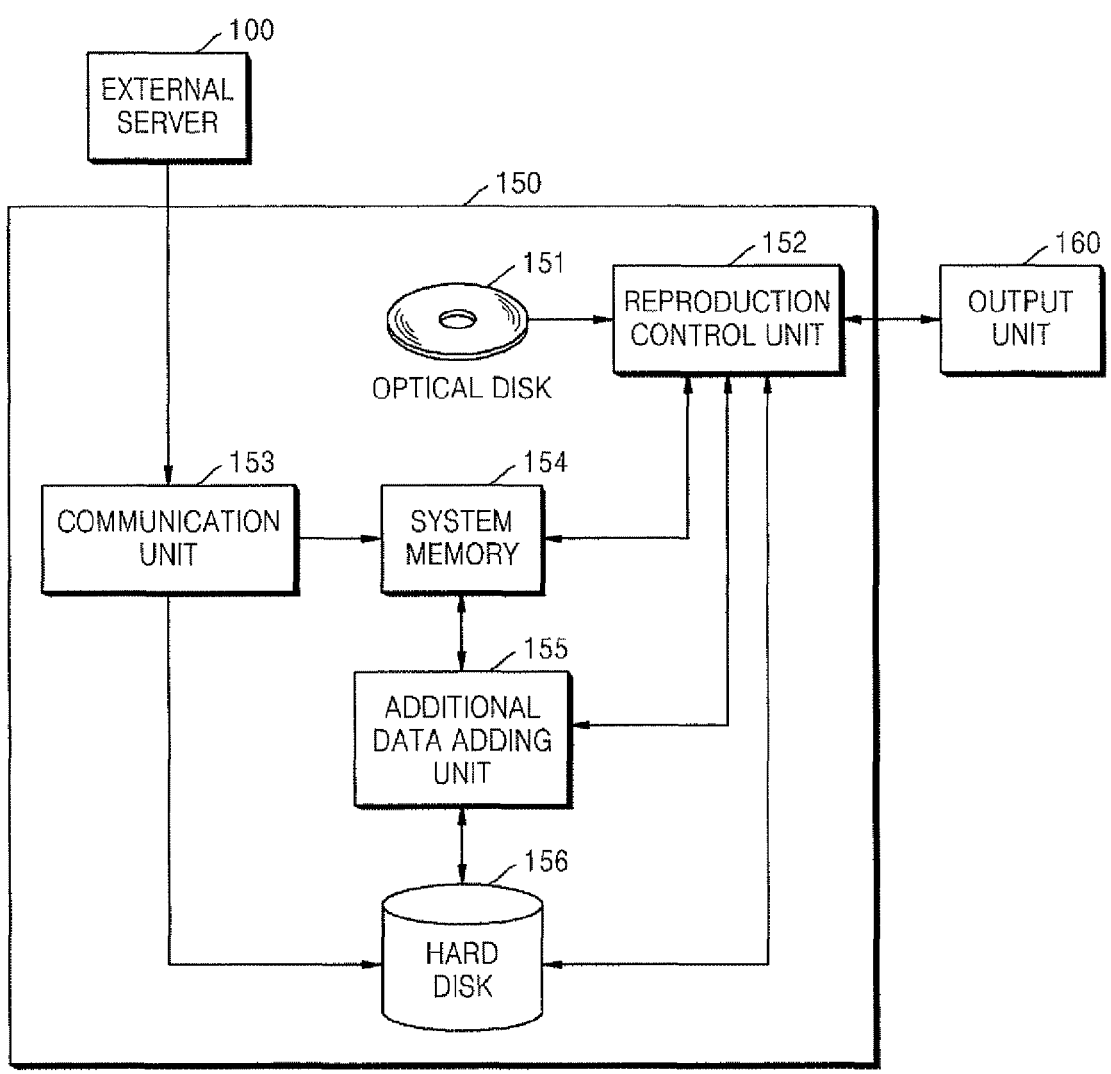
FIG. 1 is a configuration diagram of a reproducing apparatus to update additional data, according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention, by referring to the figures.

FIG. 1 is a configuration diagram of a reproducing apparatus 150 to update additional data, according to an exemplary embodiment of the present invention.

Referring to FIG. 1, the reproducing apparatus 150 includes a communication unit 153 to exchange information with an external server 100. The external server 100 can be connected to a network, such as the Internet. The reproducing apparatus 150 includes a reproduction control unit 152 and an additional data adding unit 155. The reproduction control unit 152 reproduces audio visual (AV) data recorded on an optical disk 151 and reproduces additional data, downloaded from the external server 100 through the communication unit 153, together with the data recorded on the optical disk 151. The reproduction control unit 152 outputs the downloaded additional data, in combination with the recorded data (AV data), to an output unit 160. The additional data adding unit 155 updates reproduction control information of AV data, so as to reproduce the additional data in synchronization with AV data currently being reproduced. The additional data is downloaded to a local storage, such as, a hard disk 156 or a system memory 154.

According to various embodiments the reproduction control unit 152 can include the additional data adding unit 152. The reproduction control unit 152 can store reproduction information in the system memory 154. The reproduction information can relate to information about a title, a play list, and/or a play item, such as identification information of the play item. The reproduction control unit 152 can update the reproduction information using clip information of the additional data.

Figure 2:
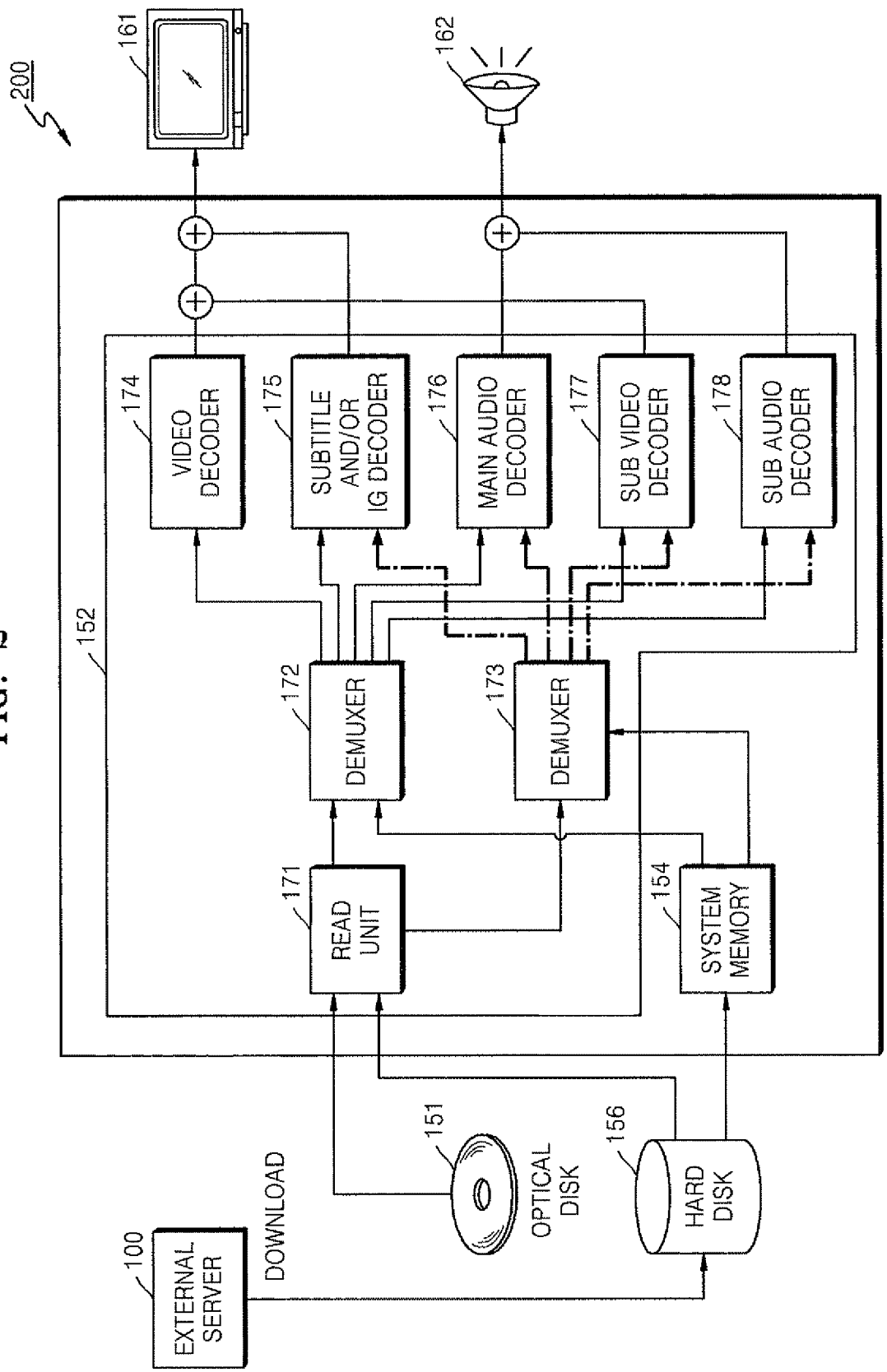
FIG. 2 is a block diagram of an apparatus to reproduce Audio Visual (AV) data and updated additional data, according to an exemplary embodiment of the present invention.

FIG. 2 is a block diagram of an apparatus 200 to reproduce AV data and update/download additional data, according to an exemplary embodiment of the present invention. Similar elements have the same reference numbers as disclosed with regard to FIG. 1.

Referring to FIG. 2, the apparatus comprises the reproduction control unit 152. The reproduction control unit 152 comprises a read unit 171, demuxers 172 and 173, a video decoder 174, a subtitle and/or IG decoder, a main audio decoder 176, a sub-video decoder 177, and a sub-audio decoder 178. The AV data is present in a recorded format on the optical disk 151, and the additional data is downloaded from the external server 100 and stored in the hard disk 156 or the system memory 154. The AV data and the additional data are read by the reading unit 171 and separated by the demuxers 172 and 173, into a main video stream, a main audio stream, a subtitle and/or interactive stream, a sub-video stream, and/or a sub-audio stream. The main video stream, the main audio stream, the subtitle and/or interactive stream, the sub-video stream, and/or the sub-audio stream, are respectively reproduced by the video decoder 174, the main audio decoder 176, the subtitle and/or IG decoder 175, the sub-video decoder 177, and the sub-audio decoder 178 and are output to a display 161 and/or a speaker 162.

Figure 3:
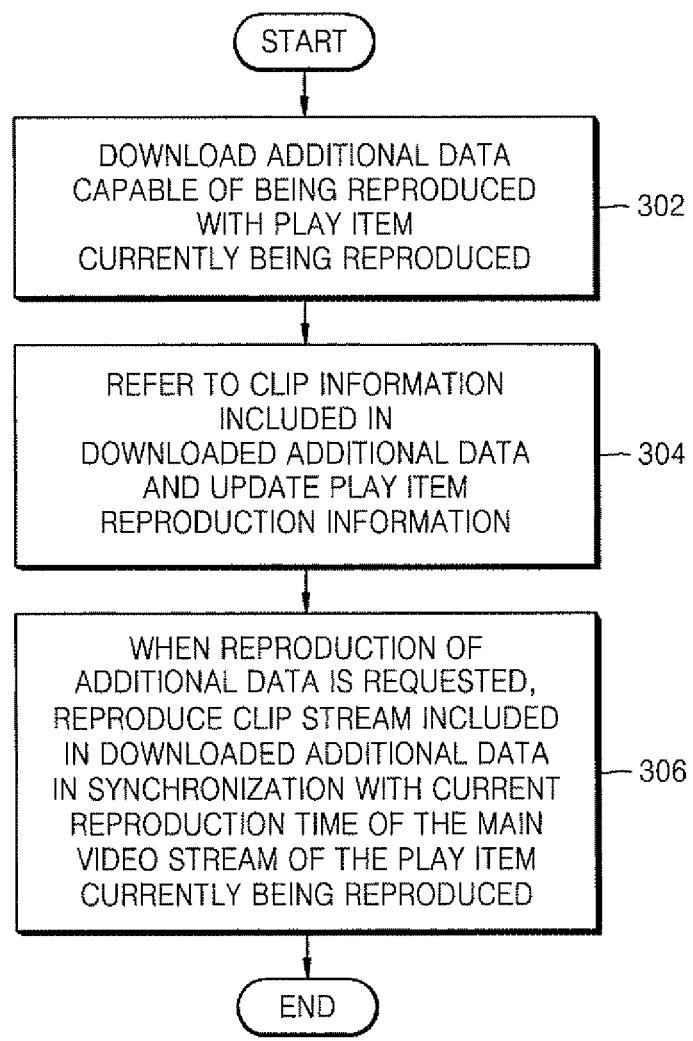
FIG. 3 is a flowchart illustrating a method of updating additional data, according to an exemplary embodiment of the present invention.

FIG. 3 is a flowchart illustrating a method of updating/downloading additional data, according to an exemplary embodiment of the present invention.

Referring to FIG. 3, the reproduction control unit 152 downloads the additional data, which can include a clip stream, while reproducing the AV data from the optical disk 151, in operation 302. The AV data that is being reproduced can be referred to as a play item. The play item can include a main video stream. The play item can be an entire movie or a chapter of a movie. The additional data is capable of being reproduced concurrently with the play item, for example, concurrently with a main video stream of the play item.

According to control by the reproduction control unit 152, the additional data adding unit 155 reads clip information included in the downloaded additional data and updates reproduction information of the play item currently being reproduced, in operation 304. In other words, the reproduction information of the play item can be modified such that a clip stream of the additional data is added to the reproduction information the play item, such that the main video stream of the play item is synchronized with the clip stream.

In operation 306, when a reproduction of the downloaded additional data is requested by a user, the reproduction control unit 152 refers to the updated play item reproduction information, in order to reproduce the downloaded additional data. A clip stream included in the downloaded additional data is reproduced in synchronization with a current reproduction point of the main video stream of the play item currently being reproduced. In the case of a blue-ray disk player, the reproduction of AV data and the updating of the additional data are performed and controlled by a java application and a system application. A method of downloading and reproducing additional data in the reproduction control unit 152 will be described later, with reference to FIGS. 4 and 6. A method of updating play item reproduction information in the additional data adding unit 155 will be described later, with reference to FIG. 5.

Figure 4:
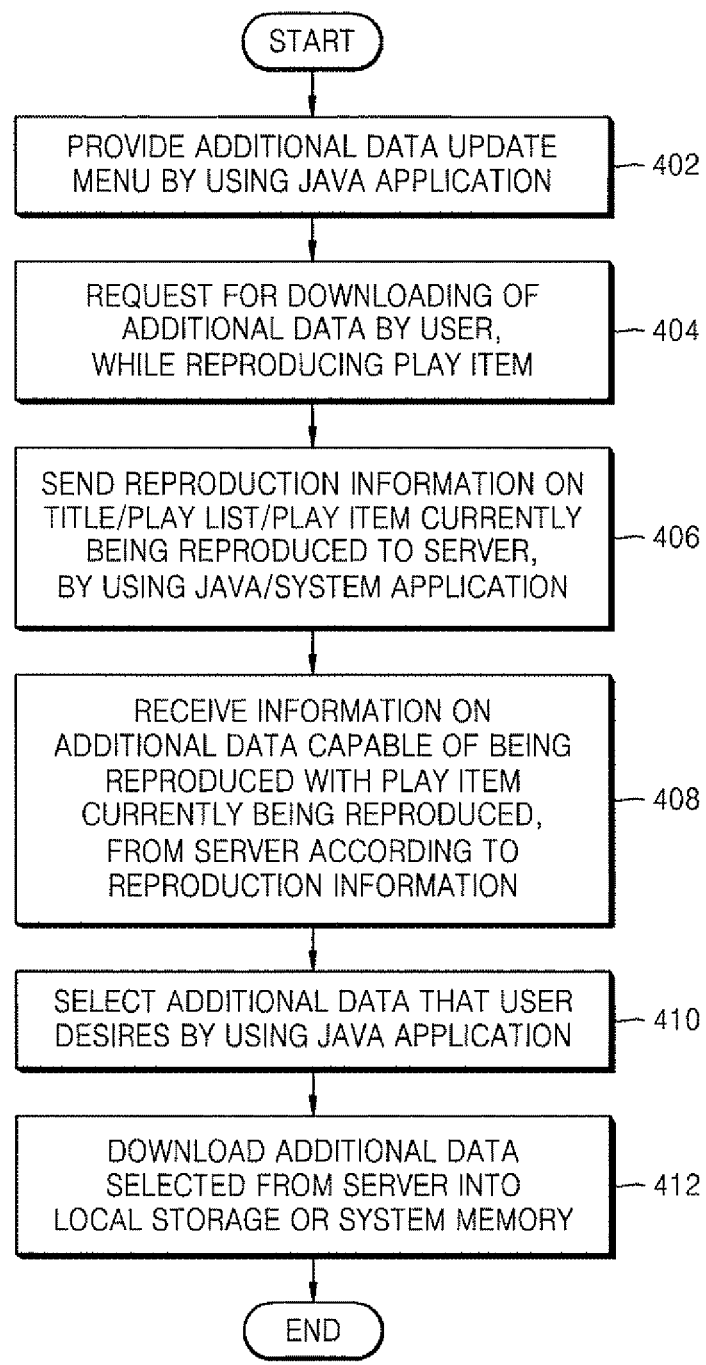
FIG. 4 is a flowchart illustrating a method of downloading additional data, according to an exemplary embodiment of the present invention.

FIG. 4 is a flowchart illustrating a method of downloading additional data, according to an exemplary embodiment of the present invention.

Referring to FIG. 4, a java application provides an additional data update menu, in operation 402. A user can reproduce additional data, other than the additional data (subtitle, audio, and etc) provided by the optical disk 151, while reproducing the play item from the optical disk 151. For example, if English and French subtitles are provided by the optical disk 151, but the user desires Korean subtitles, the user connects with the external server 100. The external server 100 can be a server designated by the optical disk 151, for example, a web server. The user can use a menu provided by the optical disk 151 (in the case of a blue-ray disk, a menu provided through a java application) to initiate the connection. An additional data list can be requested by a user using the menu displayed on a display showing the AV data and then downloaded, in operation 404.

In operation 406, a java application or a system application sends reproduction information of the play item to the external server 100. The reproduction information can include a title, a play list, and/or a play item. The reproduction information can be read from the optical disk 151. The external server 100 refers to the reproduction information and searches for information related additional data that can be reproduced concurrently with the play item currently being reproduced. A java application receives information searched for by the external server 100 and displays an additional data list to the user, in operation 408. The user selects desired additional data from the additional data list, which can be downloaded, by using the menu provided by a java application, in operation 410.

A java application sends a request to download the additional data selected by the user, to the external server 100, receives the user selected additional data from the external server 100 and stores the additional data in the local storage 156 or the system memory 154, in operation 412. Only a clip including a clip stream and clip information that correspond to the selected additional data is downloaded, as opposed to downloading all database files for the selected additional data.

The clip information can include packet ID (PID) and stream information, related to the clip stream. The clip information can include a length of the clip stream and reproduction start information of the clip stream.

Figure 5:
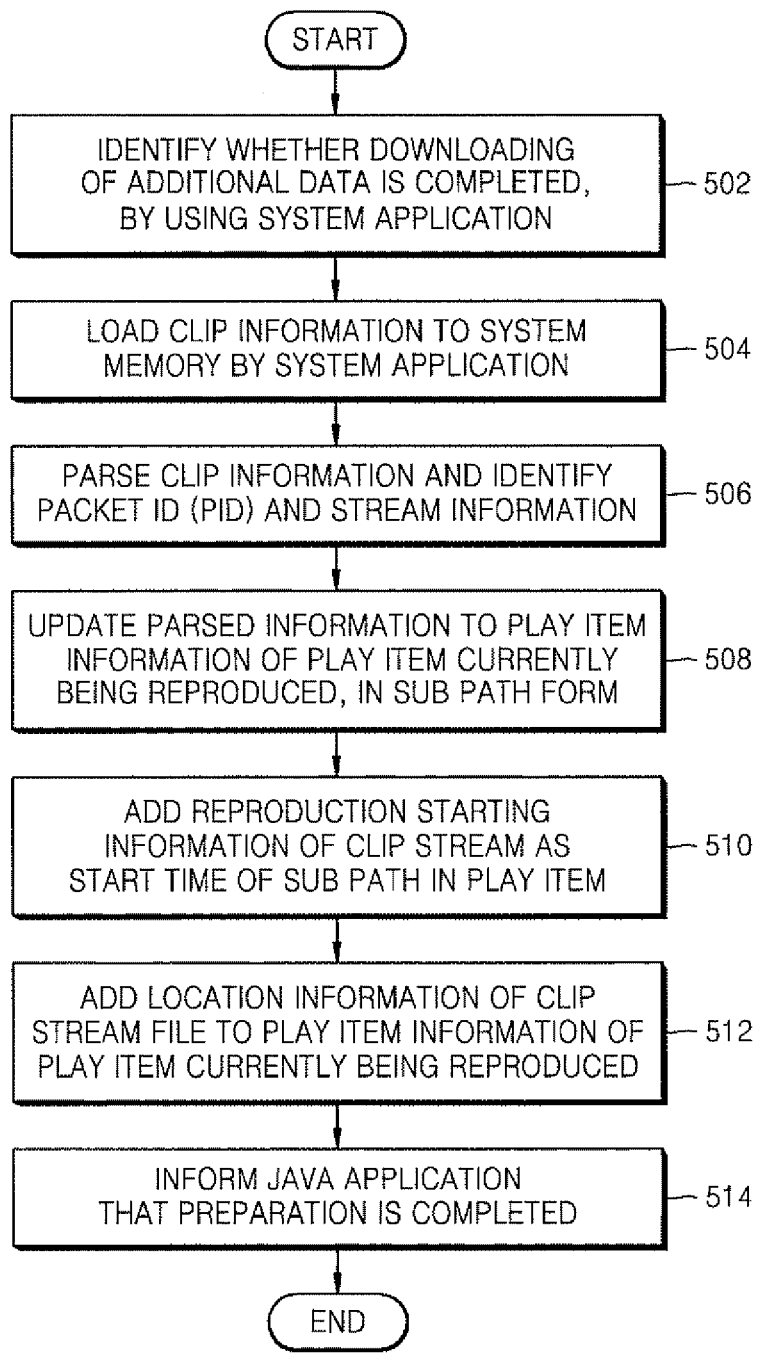
FIG. 5 is a flowchart illustrating a method of updating reproduction information, according to an exemplary embodiment of the present invention.

FIG. 5 is a flowchart illustrating a method of updating the play item reproduction information, according to an exemplary embodiment of the present invention.

Referring to FIG. 5, a system application identifies whether the downloading of the additional data is completed. When the downloading is completed, a file location and a file name of the downloaded additional data are transmitted to the system application of the reproducing apparatus 150 and processed by a java application, in operation 502.

The system application loads the clip information included in the additional data to the system memory 154, in operation 504. The clip information is parsed to determine the packet ID (PID) and the stream information, in operation 506. In operation 508, the reproduction information of the AV data is updated, according to the parsing, and the clip stream of the additional data is added as a new sub-path in the reproduction information of the play item currently being reproduced. In addition, a start time of the clip stream is recorded as a start time (in-time) of the new sub-path, in operation 510. A file location of the clip stream of the additional data is recorded in the reproduction information of the play item currently being reproduced, to complete the preparation of the additional data for reproduction, in operation 512. The system application informs the java application that the preparation is completed, in operation 514.

FIG. 6 is a flowchart illustrating a method of reproducing the downloaded additional data, according to an exemplary embodiment of the present invention. The method reproduces the additional data in synchronization with the play item currently being reproduced, by using the updated play item reproduction information.

Referring to FIG. 6, in operation 602, a java application informs a user that the additional data, is prepared for reproduction. Such a message can be output through a menu displayed on the display 161, where the AV data is currently being reproduced. The user selects the clip stream for reproduction, by using the menu, in operation 604.

The clip stream is synchronized with the main video stream of the play item currently being reproduced, in order for the two streams to be reproduced properly. A current reproduction time of the clip stream (a location in the additional data where a reproduction of the clip stream is to begin) is determined according to a length and a start time of the clip stream. In other words, the start time of the clip stream and the start time of the play item are compared to determine a current reproduction time of the clip stream that coincides with a current reproduction time of the play item.

In operation 606, when the length of the clip stream is the same as a length of the play item currently being reproduced, i.e. the reproduction start times are the same, the clip stream is reproduced from a location in the additional data that corresponds to a location in the AV data where the play item is currently being reproduced from. Accordingly, a difference between a start time of the play item and a current reproduction time of the play item is measured, and the current reproduction time of the clip stream is calculated, according to the difference. In other words, the location in the AV data, where the play item is currently being reproduced, is determined, and an equivalent location in the additional data, corresponding to the clip stream, is used as the current reproduction start time of the clip stream.

In operation 606, if the length of the clip stream is different from the length of the length of the play item, for example, when the start time (in-time) of the clip stream is a time when a download is requested, i.e., at a time after the start time of the play item, the reproduction time of the clip stream is determined according to a difference between the time when a download is requested and the current reproduction time of the play item. Since the clip stream is reproduced from the current reproduction time determined as described above, the new additional data can be reproduced in synchronization with the main video stream without a title conversion, in operation 610.

The method according to the aspects of the present invention can be embodied as a computer readable code recorded on a computer readable medium.

According to aspects of the present invention, instead of the additional data currently being reproduced, the downloaded additional data can be reproduced along with AV data without converting a title, while reproducing AV data. Consequently, a sub-title can be changed while continuously reproducing AV data, without having to stop the reproduction of the AV data. Various components of the apparatus for reproducing AV data and additional data, as shown in FIG. 1 and FIG. 2, such as, the communication unit, the system memory and the reproduction central unit can be integrated into a single control unit, or alternatively, can be implemented in software or hardware, such as, a field programmable gate array (FPGA) and an application specific integrated circuit (ASIC). As such, it is intended that the processes described herein be broadly interpreted as being equivalently performed by software, hardware, or a combination thereof. As previously discussed, software modules can be written, via a variety of software languages, including C, C++, Java, Visual Basic, and many others. These software modules may include data and instructions which can also be stored on one or more machine-readable storage media, such as, dynamic or static random access memories (DRAMs or SRAMs), erasable and programmable read-only memories (EEPROMs) and flash memories; magnetic disks, such as, fixed, floppy, and removable disks; other storage disks, such as, compact discs (CDs) or digital video discs (DVDs). Instructions of the software routines or modules may also be loaded or transported into the wireless cards o any computing devices on the wireless network in one of many different ways. For example, code segments including instructions stored on floppy disks, CD or DVD media, a hard disk, or transported through a network interface card, modem, or other interface devices may be loaded into the system and executed as corresponding software routines or modules. In the loading or transport process, data signals that are embodied as carrier waves (transmitted over telephone lines, networks lines, wireless links, cables, and the like) may communicate the code segments, including instructions, to the network node or element. Such carrier waves may be in the form of electrical, optical, acoustical, electromagnetic, or other types of signals.

In addition, the present invention can also be embodied as computer readable codes on a computer readable recording medium. The computer readable recording medium is any data storage device that can store data which can be thereafter read by a computer system. Examples of the computer readable medium also include read-only memory (ROM), random-access memory (RAM), COD-ROMs, magnetic tapes, floppy discs, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily constructed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of downloading additional data corresponding to audio visual (AV) data, the method comprising:
   reproducing a clip stream corresponding to a play item of the AV data;
   downloading at a control unit the additional data while reproducing the clip stream corresponding to the play item, wherein the additional data comprises an additional clip stream and additional clip information;
   updating at the control unit reproduction information of the play item according to the additional clip information, to produce updated reproduction information; and
   reproducing at the control unit the additional clip stream together with the clip stream of the play item by synchronizing the additional clip stream with a current reproduction time of the clip stream of the play item, using the updated reproduction information.

2. The method of claim 1, wherein the downloading at the control unit of the additional data comprises:
   using a menu displayed on the display over the play item, to request an additional data list from a server;
   sending the reproduction information of the play item to the server in response to the request;
   receiving the additional data list from the server and displaying the additional data list on the menu;
   using the menu to select the additional data from the additional data list and sending a request for downloading the additional data to the server; and
   receiving the additional data from the server.

3. The method of claim 1, wherein the updating at the control unit of the reproduction information comprises:
   parsing the additional clip information to determine a start time of the additional clip stream; and
   updating the reproduction information with the following:
   a sub-path for the additional clip stream;
   a start time of the sub-path according to a start time of the clip stream; and a file location of the clip stream.

4. The method of claim 1, wherein the reproducing at the control unit of the additional clip stream together with the clip stream of the play item comprises:
   signaling that the additional data is prepared for reproduction by displaying a menu on a display that is showing the clip stream of the play item; and
   using the menu to input a request for reproducing the additional data.

5. The method of claim 1, wherein the reproducing at the control unit of the additional clip stream together with the clip stream of the play item comprises:
   determining a current reproduction time of the additional clip stream according to a difference between a start time of the clip stream of the play item and the current reproduction time of the clip stream of the play item, if a length of the additional clip stream is the same a length of the clip stream of the play item; and
   determining a current reproduction time of the additional clip stream according to a difference between a download request time of the additional data and the current reproduction time of the clip stream of the play item, if a start time of the additional clip stream is different than the start time of the clip stream of the play item.

6. The method of claim 1, wherein the additional data is one of subtitle data, audio data, sub-video data, and interactive graphic data.

7. A computer program embodied on a non-transitory computer readable medium, the computer program being configured to control a processor to perform:
   reproducing a clip stream corresponding to a play item of the AV data;
   downloading additional data corresponding to audio visual (AV) data while reproducing the clip stream corresponding to the play item, wherein the additional data comprises an additional clip stream and additional clip information;
   updating reproduction information of the play item according to the additional clip information, to produce updated reproduction information; and
   reproducing the additional clip stream together with the clip stream of the play item by synchronizing the additional clip stream with a current reproduction time of the clip stream of the play item, using the updated reproduction information.

8. An apparatus for reproducing AV data and additional data, comprising:
   a communication unit configured to communicate with a server, wherein the additional data comprises an additional clip stream and additional clip information;
   a reproduction control unit configured to control the communication unit to download the additional data, to reproduce a clip stream corresponding to the play item of the AV data, and to reproduce the additional clip stream together with the clip stream of the play item without stopping the reproduction of the play item by synchronizing the additional clip stream with a current reproduction time of the clip stream of the play item; and
   an additional data adding unit to update reproduction information of play item using the additional clip information.

9. The apparatus of claim 8, wherein the reproduction control unit sends the reproduction information of the play item to a server when an additional data list is requested through a menu displayed over the play item on the display, to receive the additional data list from the server, and to send a request for the additional data, which is selected from the additional data list, so as to receive the additional data.

10. The apparatus of claim 8, wherein the additional data adding unit uses the clip information to add the following to the reproduction information
  a sub-path for the clip stream,
  as a start time of the sub-path according to a start time of the clip stream, and
  a file location of the clip stream.

11. The apparatus of claim 8, wherein the reproduction control unit indicates that the additional data is prepared for reproduction by using the menu displayed on the display and to receive a request for the reproduction of the additional data through the menu.

12. The apparatus of claim 8, wherein the reproduction control unit determines:
  a current reproduction time of the additional clip stream, according to a difference between a start time of the clip stream of the play item and current reproduction time of the clip stream of the play item, when the additional clip stream has a length that is the same as a length of the clip stream of the play item; and
  a current reproduction time of the additional clip stream according to a difference between a download request time of the additional data and the current reproduction time of the clip stream of the play item, when the additional clip stream has the download request time as a start time of the clip stream of the play item.

13. The apparatus of claim 8, wherein the additional data is one of subtitle data, audio data, sub-video data, and interactive graphic data.

14. The method of claim 1, wherein clip information comprises packet ID (PID) information of the clip stream, a length of the clip stream, and a start time of the clip stream.

15. The method of claim 5, wherein the start time of the clip stream is a downloading time of the additional data.

16. The apparatus of claim 8, wherein the reproduction control unit reproduces the clip stream in response to a request from a user.

17. The apparatus of claim 8, wherein the clip information comprises packet ID (PID) information of the clip stream, a length of the clip stream, and a start time of the clip stream.

18. An apparatus for reproducing AV data and additional data, comprising:
  a communication unit configured to communicate with an external server;
  a memory configured to store the additional data and reproduction information relating to a clip stream corresponding to the play item of the AV data, wherein the additional data comprises an additional clip stream and additional clip information downloaded from the external server via the communication unit; and
  a reproduction control unit configured to reproduce the clip stream corresponding to the play item, to update the reproduction information using the additional clip information while reproducing the play item, and to reproduce the additional clip stream together with the clip stream of the play item by synchronizing the additional clip stream with a current reproduction time of the clip stream of the play item using the updated reproduction information.

19. The apparatus of claim 18, wherein the control unit is further configured to update the reproduction information by creating a sub-path for the clip stream in the reproduction information.

20. The apparatus of claim 19, wherein the reproduction control unit is further configured to determine:
  a current reproduction time of the additional clip stream according to a difference between a start time of the clip stream of the play item and current reproduction time of the clip stream of the play item, when the additional clip stream has a length that is the same as a length of the clip stream of the play item, and
  a current reproduction time of the additional clip stream according to a difference between a download request time of the additional data and the current reproduction time of the clip stream of the play item, when the additional clip stream has the download request time as a start time of the clip stream of the play item.

21. The apparatus of claim 19, wherein the control unit uses the clip information to add the following to the reproduction information
  a sub-path for the clip stream,
  as a start time of the sub-path according to a start time of the clip stream, and
  a file location of the clip stream.

* * * * *